United States Patent
Leibowitz

(10) Patent No.: US 6,239,524 B1
(45) Date of Patent: May 29, 2001

(54) POWER CONVERSION METHODS AND APPARATUS

(76) Inventor: Martin N. Leibowitz, 1155 Hillsboro Mile, #602, Hillsboro Beach, FL (US) 33062

( * ) Notice: Subject to any disclaimer, the term of this patent is extended or adjusted under 35 U.S.C. 154(b) by 0 days.

(21) Appl. No.: 09/503,446

(22) Filed: Feb. 14, 2000

(51) Int. Cl.[7] .................. H02K 16/00; H02K 51/00
(52) U.S. Cl. .................. 310/112; 310/114; 290/6; 74/89.2; 74/665 B
(58) Field of Search .................. 310/112, 114, 310/115, 118, 120; 290/6; 74/665 B, 63, 89.2

(56) References Cited

U.S. PATENT DOCUMENTS

| | | | |
|---|---|---|---|
| 931,743 | * 8/1909 | Farrell | 310/112 |
| 1,610,666 | * 12/1926 | Farrell | 310/112 |
| 2,561,131 | * 7/1951 | Oropeza | 310/112 |
| 3,477,536 | * 11/1969 | Carini | 310/112 |
| 4,572,017 | * 2/1986 | Rossi | 74/394 |
| 4,787,259 | * 11/1988 | Carson | 74/89.2 |
| 5,260,617 | * 11/1993 | Leibowitz | 310/112 |
| 5,387,818 | * 2/1995 | Leibowitz | 310/112 |

* cited by examiner

Primary Examiner—Burton Mullins

(57) ABSTRACT

Apparatus for generating rotating motion includes one or more electrical motors or generators arranged in a circle about a central shaft. The motors or generators are attached to a rotatable plate, which in turn is attached to the central shaft. The shafts of the motors or generators are belt connected to a fixed core. Operation of the motors results in rotation of the plate and the central shaft, which further results in the motors or generators orbiting around the central shaft.

11 Claims, 5 Drawing Sheets

POWER CONVERSION METHODS AND APPARATUS

BACKGROUND OF THE INVENTION

1. Field of the Invention

This invention relates in general to the field of power conversion apparatus and in particular to the field of power conversion apparatus utilizing orbiting masses in conjunction with axial rotation of the masses.

2. Description of the Prior Art

There are numerous types of apparatus, which are used to convert energy, such as electricity, into a form, which is useful to do work. An electrical motor is a typical example wherein electrical energy is converted to rotational energy which can thereafter be used to turn wheels as in an automobile or to rotate machinery as with engine lathes, household appliances, grass cutters, and the like. The end use of such rotational energy is virtually limitless. With it, concrete can be made to build buildings, satellites can be built, natural resources can be mined, recycling can be accomplished, other electronic apparatus can be made, etc. Everywhere one looks, a product, a building or a process exists which has been made using rotational energy; that is, where the energy existed in a previous state e.g. electrical, chemical, nuclear, heat, wind, etc. and has been converted into rotational energy.

Accordingly, it is desirous and the need exists to develop rotational energy having improved efficiency, produces large amounts of power and is cost effective. The present invention fulfills this need and accomplishes these objectives.

SUMMARY OF THE INVENTION

The present invention comprises apparatus that in a preferred embodiment, converts electrical energy into rotational energy by uniquely using small electrical motors to generate orbital rotation which, in turn, utilizes the mass of the electrical motors to produce high-power output. In one embodiment, a plurality of electrical motors are equidistantly arranged about a diameter of a rotatable plate, the rotating shaft of each of the motors includes a pulley which is connected by a belt to a stationary disc or cylinder located at the center of the rotatable plate. The rotatable plate is connected at its center to a shaft or axle.

In operation, electrical energy is input to the electrical motors which causes rotation of the motor shafts. Because the other end of the belts are connected around the stationary cylinder, rotation of the motor shafts causes rotation of the rotatable plate to which the motors are attached. The speed of rotation of the rotatable plate is directly dependent upon the ratio of the diameter of the fixed cylinder to the diameter of the pulley attached to the motor shafts. The same rotational speed of the rotatable plates occurs regardless of the distance between the center of the motors to the center of the fixed cylinder; but, the further the motors are from the center of the fixed cylinder, the greater the amount of centrifugal force is created. This geometric advantage is utilized in the present invention to increase the torque and or power produced by the center shaft of the inventive apparatus.

BRIEF DESCRIPTION OF THE DRAWINGS

Various other objects, advantages, and features of the invention will become apparent to those skilled in the art from the following discussion taken in conjunction with the following drawings, in which.

DESCRIPTION OF THE PREFERRED EMBODIMENTS

Figure 1:
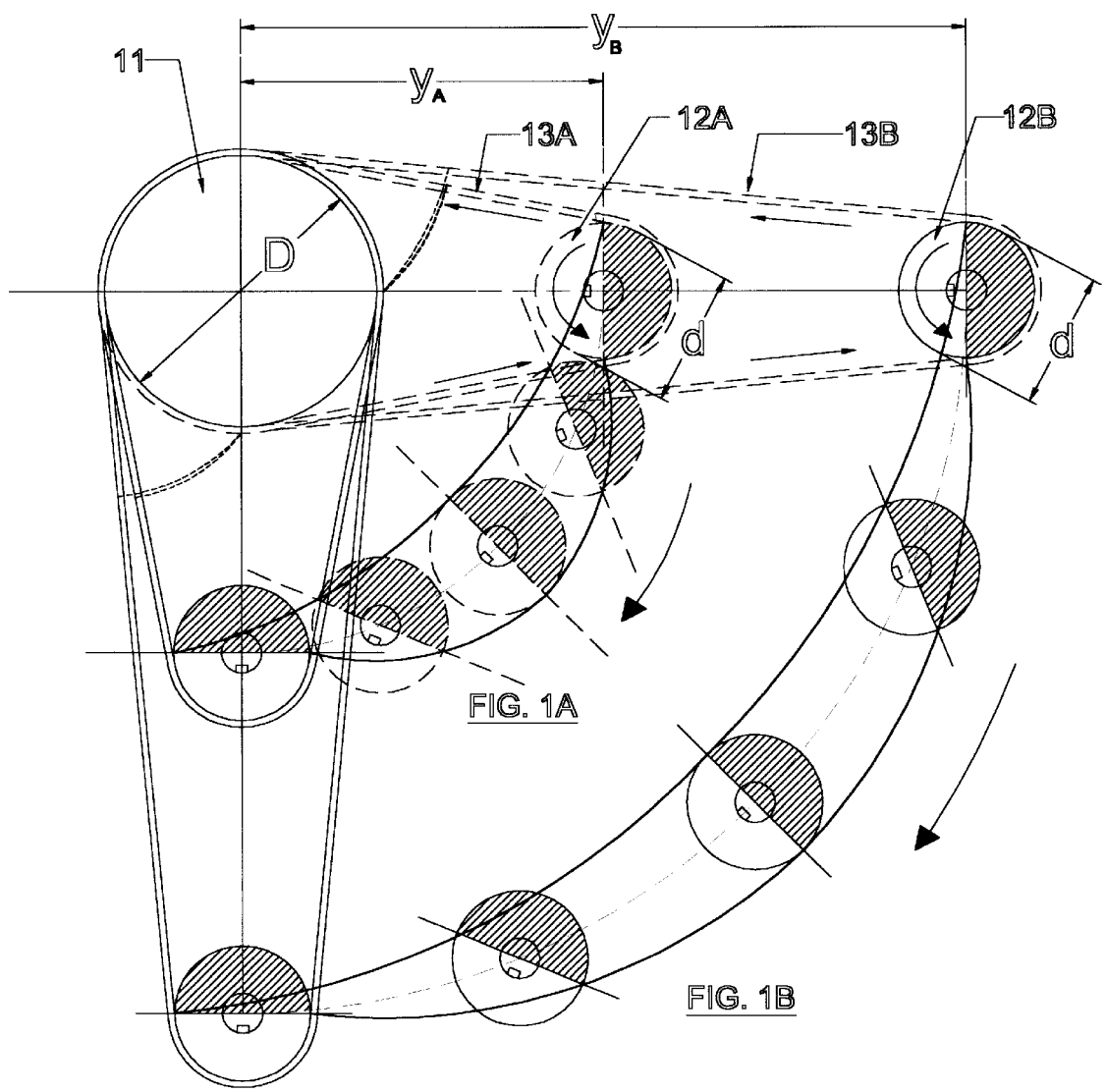
FIGS. 1A and 1B schematically illustrate the principle of operation of the inventive apparatus.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Also, the terminology used herein is for the purpose of description and not of limitation.

Reference is now made to the drawings, wherein like characteristics and features of the present invention shown in the various FIGS. are designated by the same reference numerals.

The principle of operation of the inventive apparatus is schematically illustrated in FIGS. 1A and 1B of the drawings. A fixed member 11 has a diameter of, for example, 2X. A rotatable pulley 12 is spaced from the fixed member 11 by a distance, for example, of Y and has a diameter of X. The pulley 12 is free to rotate about its own axis and to orbit around the fixed member 11. A belt 13 is connected around the pulley 12 and the fixed member 11. Assuming that the belt 13 does not slip, rotation of the pulley about it's own axis results in the pulley rotating two times about it's own axis while making one orbit around the fixed member 11 core because of the described geometry between the fixed member diameter and the pulley diameter. The orbiting rotation occurs because the pulley's rotation causes the belt to rotate around the pulley, which because the belt does not slip, causes the pulley to orbit about the fixed core.

In FIG. 1B, the diameters of the fixed member 11 and the pulley 12 are the same as in FIG. 1A, but the distance between the center of the pulley 12 and the center of the fixed member 11 is two times that of FIG. 1A. Again, provided that the belt 13 does not slip, rotation of the pulley 12 about it's own axis results in the pulley 12 orbiting about the fixed member 11. In this example the pulley 12 again rotates twice about its own axis while making one orbital rotation about the fixed core 11.

In both FIG. 1A and FIG. 1B, it is to be noted that the rotation of the pulley 12 in the direction shown causes the belt 13 to rotate in a counter clockwise direction which results in the orbiting of said pulley member in a clockwise direction. However, regardless of the instantaneous orbital position of the pulley member, the angle of the belt relative to the line between the centers of the fixed member 11 and the pulley 12 remains a constant. This angle causes an offset force which continually causes the orbiting motion (other than for a ratio of 1:1).

Thus, the distance between the center of the pulley 12 and the center of the fixed member 11, in the example of FIGS. 1A and 1B, is immaterial to the number of orbits made by the pulley 12 about the fixed member and the number of rotations made by the pulley 12 about its own axis. Two rotations of the pulley 12 about its own axis results in one orbital rotation of the pulley 12 around the fixed member 11. Even if the distance between the pulley 12 and the fixed member 11 is ten times that of FIG. 1A, the pulley 12 will still make two rotations about its axial center while making one orbital revolution about the center of the fixed member 11. But, because the location of the pulley 12 of FIG. 1B from the fixed core 11 is two times the distance of FIG. 1A, the centrifugal force of the pulley 12 of FIG. 1B, as it orbits about the fixed member 11 is two times that of FIG. 1A. As noted above, the present invention utilizes this principle to convert motor torque to shaft torque or to convert motor power to shaft power. The advantage being the ability to use a number of small inexpensive motors to produce the output of a much more expensive large motor. The further advantage being the ability to use smaller diameter wiring to carry a number of small amounts of electricity rather than large wires to conduct large amounts of electricity. It is well accepted that the cost of manufacture and operation of larger, more powerful motors increase disproportionately with size.

Figure 2:
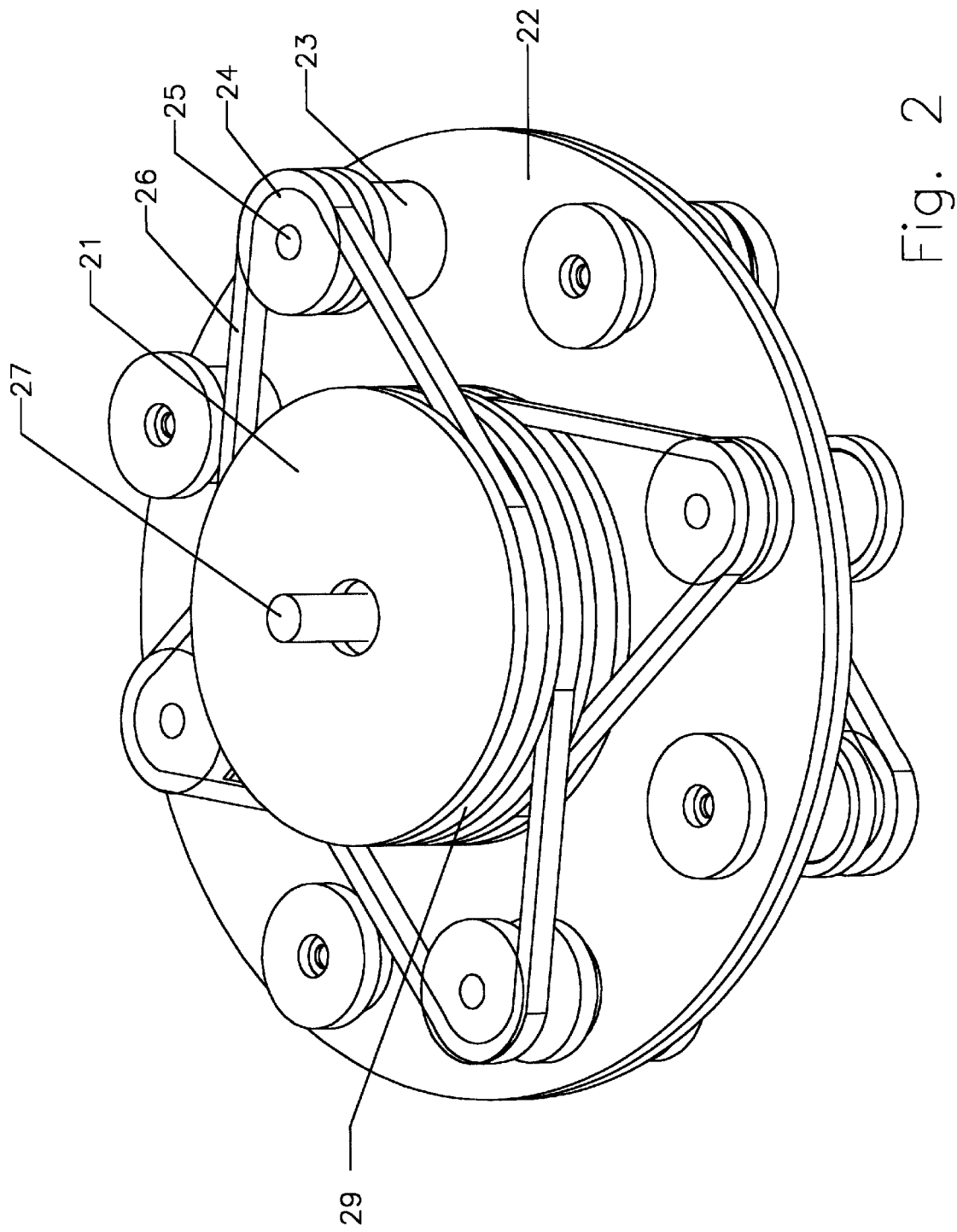
FIG. 2 is a schematic illustration of one embodiment of the present invention.

FIG. 2 illustrates a schematic arrangement of one embodiment 20 of the present invention. A fixed core 21 may comprise a hollow cylinder, a solid cylinder, or a plurality of cylinders having opposite planar ends with a central longitudinal axis. A rotatable plate 22 is arranged concentric with the core's longitudinal axis, perpendicular thereto and approximately equidistant from the planar ends of the fixed core 21. Alternatively, the rotatable plate 22 may be positioned an axially spaced distance from adjacent ends of two axially aligned fixed cores 21. In this embodiment, eight motors 23 are used. Each motor 23 is arranged about a common diameter of the rotatable plate 22 with equal spacing between the motors 23. A pulley 24 is attached to each of the motor shafts 25. The motor shafts 25 may be double-ended so that a pulley 24 is attached to each end, or the motor shafts may be single-ended with a pulley 24 attached to the one extending end. If single-ended shafts are used, alternative motors 23 may be turned end-for-end, as shown in FIG. 2, so as to balance the rotational forces on either side of the rotatable plate 22. A non-slipping belt 26 extends around each of the pulleys 24 and around the fixed core 21. The belts 26 are arranged at different axial locations along the longitudinal axis of the fixed core 21 so as not to interfere with each other. Thus, in the embodiment of FIG. 2, three belts 26 are arranged one above the other at the upper fixed core 21 and three belts 26 are each arranged one below the other at the lower fixed core 21. To ensure that the belts 26 do not cross over each other, the location of the pulleys 24 on the motor shafts 25 are arranged at different axial levels consistent with the axial location of the belts 26 around the fixed core 21. An axial center shaft 27 is fixedly connected to the center of the rotatable plate 22 such that rotation of the rotatable plate 14 causes rotation of the center shaft 27.

Figure 3:
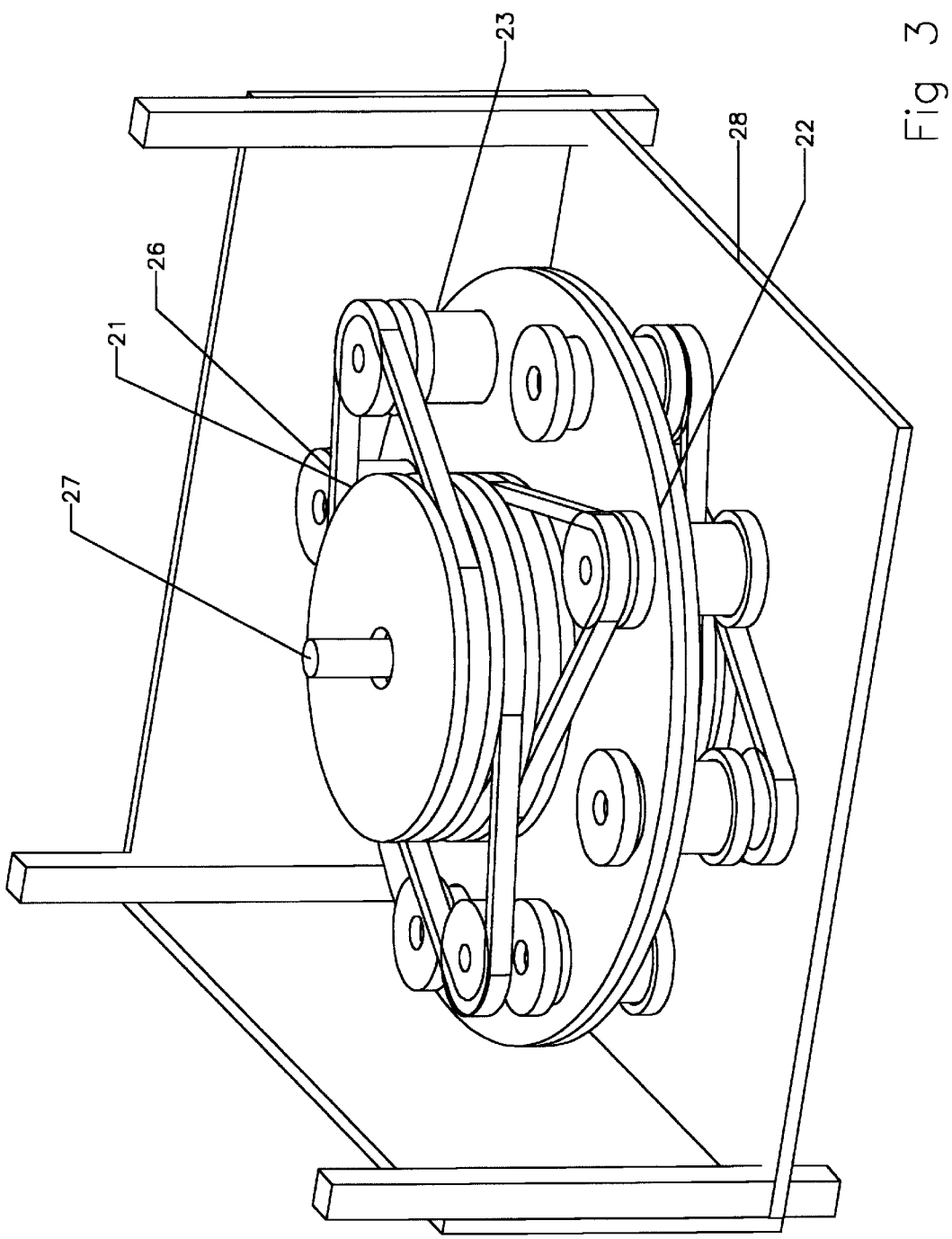
FIG. 3 is a schematic illustration of another embodiment of the present invention.

As shown in FIG. 3, a housing 28 is provided around the fixed core 21, the rotatable plate 22 and the motors 23. In this arrangement, the fixed core 21 may be fixedly connected by conventional means to the housing 28. Appropriate bearings and shoulders between the center shaft 27 and the fixed core 21 provide for fixation of the location of the center shaft 27 and the rotatable plate 22 attached to the center shaft 27. Each of the motors 23 may be connected by conventional means to the rotatable plate 22. Tracks 29 may be provided around the diameter of the fixed core 21 to fixedly locate the position of each of the belts 26. Electricity to the motors 23 may be routed using wiring extending through the center shaft and along the rotatable plate 22 utilizing slip rings to provide the electrical connection between the non-rotating and the rotating electrical wiring. Other conventional methods are readily envisioned to make an electrical connection between a stationary wire and moving wire.

The drive belts 26 may comprise a type of belt commonly referred to as a timing belt, which has a plurality of teeth along the inside diameter thereof. Corresponding and mating teeth may be provided on the outer diameters of the pulleys 24 and the fixed core 21. Or, the belts 26 can comprise a type of bicycle chain. With proper tensioning of the belts 26, rotation of the pulleys 24 about their own axis will cause non-slipping rotation of the belts 26, which in turn will cause rotation of the rotatable plate 22 as explained above. In this manner, energizing the electrical motors 23 provides for rotation of the motor shafts 25 and the pulleys 24 attached thereto and rotation of the rotatable plate 22. Since the motors 23 are attached to the rotatable plate 22, the motors 23 themselves move in orbital rotation about the center of the fixed core 21. Using a geometric configuration of the pulleys 24 and fixed core 21 similar to that shown in FIGS. 1A and 1B, the torque or power produced by the center shaft 27 will be a combination of the speed of rotation of the rotatable plate 22 and the centrifugal force of the mass of the motors 23 as they orbit about the axial shaft 27. Inasmuch as the torque output by the axial shaft 27 is a function of square of the rotational speed, times the square of the distance between centers, times the total mass of the motors, it is seen that an increase of the rotational speed and distance between centers exponentially increases the output torque. Further, inasmuch as the power output at the center shaft 27 is a further function of the output torque times the rotational speed, the rotational speed has an overall cubic effect on the output power. Thus, the present invention provides for very large power outputs, all of which results from the rotational energy of the motors 23 about their own axis.

In FIG. 2, in another embodiment, all of the electrical motors 23 may be replaced with electrical generators. This embodiment provides for the output of electrical energy, rather than the output of only torque or mechanical power.

In another embodiment of the present invention, one or more of the electrical motors 23 shown in FIG. 2 are replaced with one or more electrical generators where the rotation of the rotatable plate 22 by the electrical motors 23 causes rotation of the belts 26 attached to the generators. This in turn causes rotation of the generators about their own axis as they orbit around the fixed core 21. Thus, in this embodiment, the output is a combination of electrical energy, torque and or power.

Figure 4:
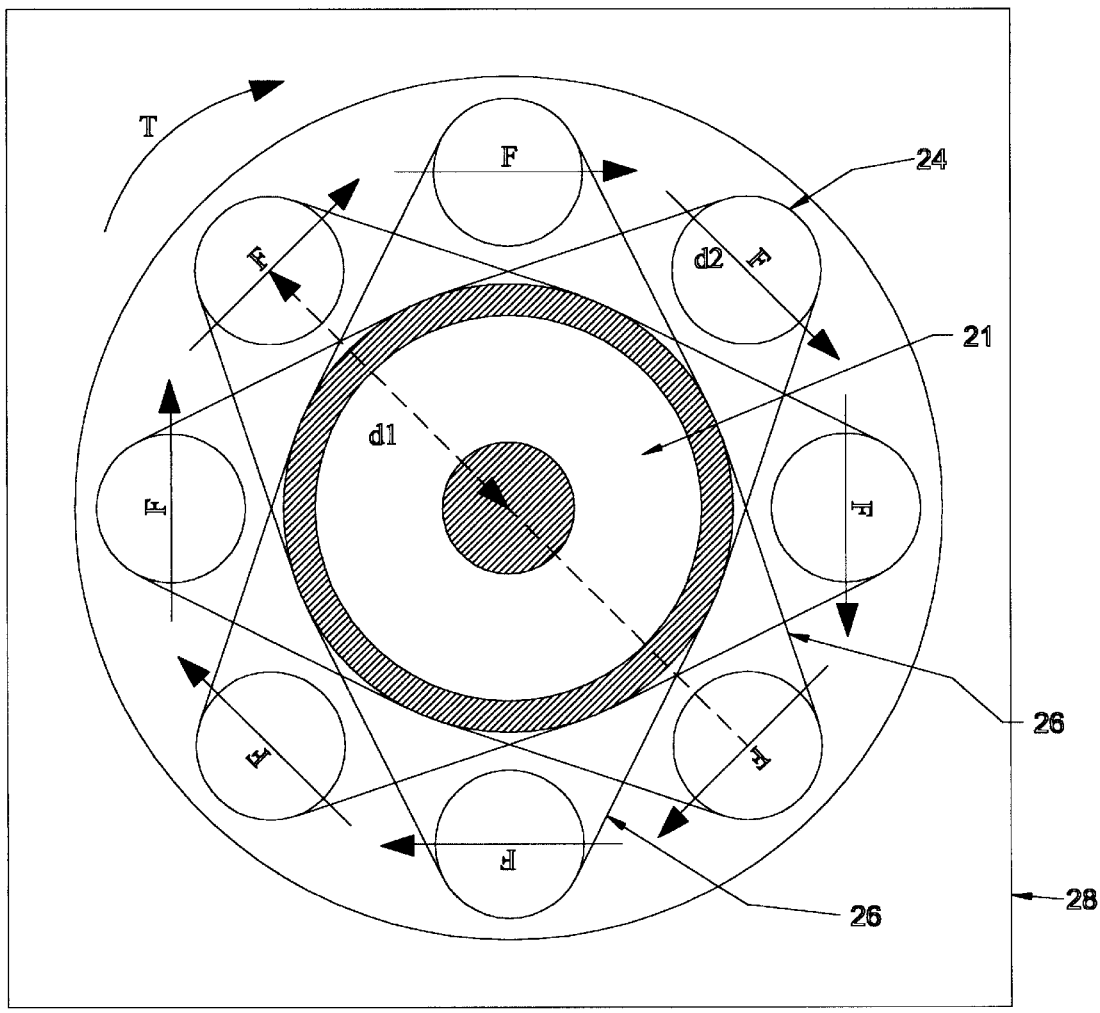
FIG. 4 is a schematic illustration of another embodiment of the present invention.

FIG. 4 schematically illustrates an embodiment whereby a belt 26 is attached to three of the plurality of motors 23 and to the fixed core 21 with the three motors 23 being in a triangular array. In this embodiment, a total of eight belts 26 are still used. One skilled in the art may readily envision many other combinations of belts and motors or generators connected to the fixed core 21, all of which combinations are intended to be included within the breath and scope of the present invention.

The belt system in the present invention is not of course to be limited to any particular type or material. The main aspect is that the belt 26 must not slip relative to the pulley 24 and relative to the fixed core 21.

The ratio of the diameter of the fixed core 21 relative to the pulley 24 is immaterial to the invention. Any ratio is satisfactory. Any distance between the center of the fixed core 21 and the center of the pulleys is also satisfactory including a distance equal to the sum of the radii of the fixed core 21 and the pulley 24.

Arms or links connecting the motors 23 to the center shaft 27 may be used in place of the rotatable plate 22. However, the rotatable plate 22 is preferred because of better harmonic balance and the ability to precisely locate and attach the motors 23.

A housing 28 around the moving parts is not essential provided that the shaft 27 is connected through bearings or bushings to the fixed core 11, which in turn is attached to a fixed object.

Figure 5:
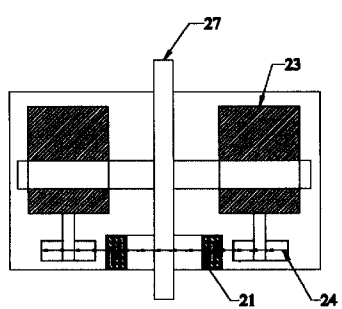
FIGS. 5–11 schematically illustrate various other configurations which the present invention may assume in practice.
Figure 6:
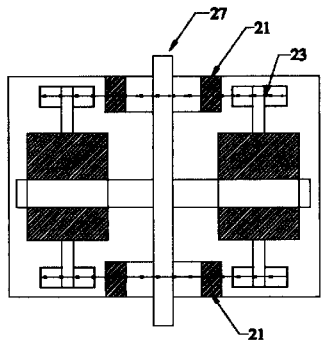
Figure 7:
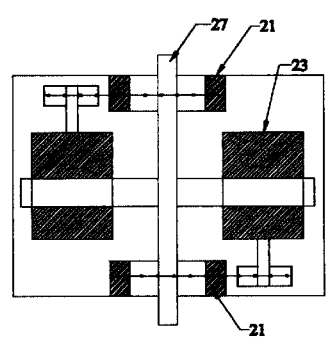
Figure 8:
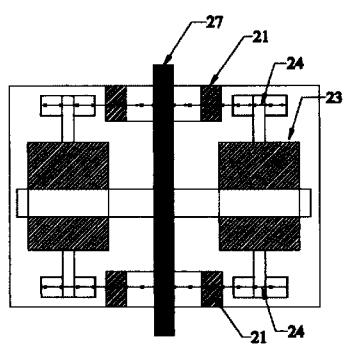
Figure 9:
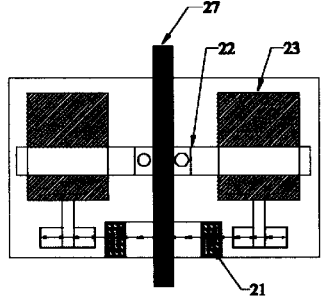
Figure 10:
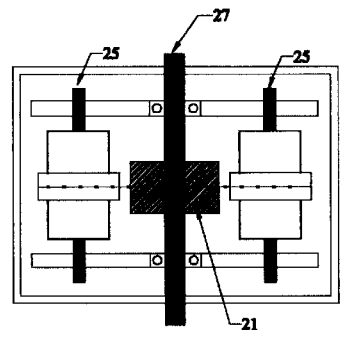
Figure 11:
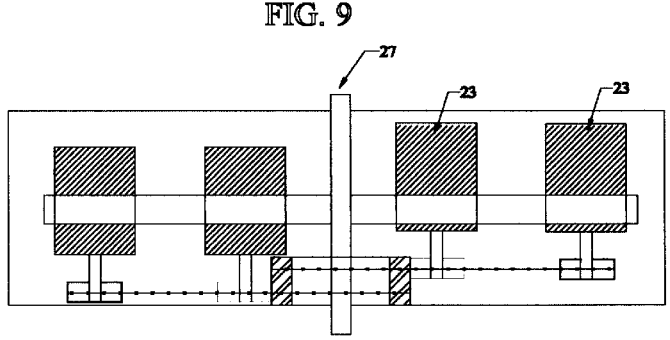

FIGS. 5–11 schematically illustrate some of the further embodiments of the present invention. FIG. 5 illustrates the use of the fixed core 21 below the housing of the electrical motors 23. FIG. 6 illustrates the use of two fixed cores 21, each respectively positioned above and below the motor housing. FIG. 7 illustrates two fixed cores 21 with the motors 23 alternatively arranged end for end. FIG. 8 illustrates the use of a generator 23 with its casing attached to the rotating plate 22 and the generator shaft is fixedly connected to the fixed cores 21. FIG. 9 illustrates an arrangement whereby the center shaft 27 is fixedly connected to the fixed core 21 and a bearing is positioned between the rotatable plate 22 and the center shaft 27. FIG. 10 illustrates an arrangement where the motor casings rotate instead of the motor shafts 25, which are stationary. FIG. 11 illustrates an arrangement where outboard motors or generators 23 are belt connected to inboard motors or generators 23. Obviously, many other non-described combinations may be readily envisioned by one ordinarily skilled in the art.

While the invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the breadth and scope of the claims here appended.

I claim as my invention:

1. A method for generating rotational power from electricity, comprising the steps of:
    arranging one or more electrical motors in a circle about a rotatable central shaft, whereby a shaft of said one or more electrical motors is free to rotate about its own axis;
    arranging a fixed core concentric to said rotatable central shaft;
    arranging said one or more electrical motors to orbit about said fixed core;
    arranging said central shaft to rotate about an axial center of said fixed core;
    connecting a belt around said fixed core and around each of said one or more electrical motor shafts; and
    rotating said central shaft by energizing said one or more electrical motors whereby the shaft of each of said one or more electrical motors rotates about its own axis and said one or more motors orbit about said fixed core.

2. The method of claim 1, including the step of substituting one or more electrical generators for said one or more electrical motors.

3. Apparatus for generating rotational motion, comprising:
    a central rotatable shaft;
    one or more electrical motors, each having a motor housing and a rotatable motor shaft, arranged in a circle about said central rotatable shaft, said motor housing of said one or more electrical motors being fixedly connected to said central rotatable shaft;
    a fixed core arranged concentric with said rotatable central shaft; and
    a drive means connecting each shaft of said one or more electrical motors to said fixed core whereby rotation of said one or more motor shafts results in orbiting of said one or more electrical motors about said fixed core and turning of said rotatable central shaft.

4. The apparatus of claim 3, wherein a pulley is connected to each of said one or more motor shafts.

5. The apparatus of claim 4, wherein said one or more electrical motors is spaced a discrete distance from an outer surface of said fixed core.

6. The apparatus of claim 4, wherein said one or more pulleys is each spaced a discrete distance from an outer surface of said fixed core.

7. The apparatus of claim 6, wherein said fixed core has a circular cross section perpendicular to said central rotatable shaft.

8. The apparatus of claim 3, wherein said one or more motors comprises a plurality of motors.

9. The apparatus of claim 8, wherein one or more electrical generators are substituted for one or more of said plurality of electrical motors.

10. The apparatus of claim 3, including one or more electrical generators arranged in a circle about said central rotatable shaft and a belt is connected to a shaft of each of said one or more generators and said fixed core.

11. The apparatus of claim 3, wherein said drive means comprises a belt.

* * * * *